United States Patent [19]

Kakida et al.

[11] Patent Number: 5,337,881
[45] Date of Patent: Aug. 16, 1994

[54] OVERHEAD WORK SUSPENSION CONVEYOR

[75] Inventors: Takuya Kakida, Kurashiki; Noriyuki Inoue, Okayama; Shoichi Okada, Kurashiki; Yoshiki Nakamura, Kurashiki; Wakaharu Ikeda, Kurashiki; Akira Mikami, Kurashiki; Akiyoshi Kimura, Kurashiki; Masayuki Aihara, Kurashiki; Hisashi Fujiwara, Tamano; Yuji Watanabe, Okayama, all of Japan

[73] Assignee: Mitsubishi Jidosha Kogyo Kabushiki Kaisha, Japan

[21] Appl. No.: 993,781

[22] Filed: Dec. 21, 1992

[51] Int. Cl.⁵ ............................................... B65G 47/24
[52] U.S. Cl. ........................... 198/409; 198/468.2; 198/468.6; 198/468.8; 414/901; 901/39; 294/67.31
[58] Field of Search .............. 198/468.2, 468.6, 468.8, 198/409; 414/591; 901/7, 39, 30–32; 294/93–97, 106, 902, 67.31

[56] References Cited

U.S. PATENT DOCUMENTS

| | | | |
|---|---|---|---|
| 2,102,337 | 12/1937 | Rose | 198/409 |
| 2,960,206 | 11/1960 | Dougherty | 198/468.2 |
| 3,987,905 | 10/1976 | Dechantsreiter | 414/591 |
| 4,645,411 | 2/1987 | Madwed | 198/468.2 |
| 4,685,208 | 8/1987 | Sekiraku . | |
| 4,930,213 | 6/1990 | Hayakawa et al. . | |

FOREIGN PATENT DOCUMENTS

| | | |
|---|---|---|
| 0126716 | 11/1984 | European Pat. Off. . |
| 0320315 | 6/1989 | European Pat. Off. . |
| 61-178308 | 8/1986 | Japan . |

Primary Examiner—Joseph E. Valenza
Attorney, Agent, or Firm—Wegner, Cantor, Mueller & Player

[57] ABSTRACT

This invention relates to an overhead work suspension conveyor for conveying a piece of work, for example, a tailgate to a main body in an assembly line of a vehicle main body. An object of this invention is to efficiently and surely hold plural kinds of work pieces of different configurations in a suspended position and to permit their easy loading on a work conveyance mechanism. This invention therefore provides an overhead work suspension conveyor comprising a traverser main body, plural spindles turnably supported relative to the traverser main body, plural work support members fixed at upper ends thereof on the spindles and having work supports at lower ends thereof, said work supports being turnable responsive to turning of the corresponding spindles to support a piece of work at an outer periphery thereof, and a spindle drive mechanism arranged on the traverser main body and adapted to selectively turn the spindle depending on the kind of the work piece.

9 Claims, 15 Drawing Sheets

OVERHEAD WORK SUSPENSION CONVEYOR

BACKGROUND OF THE INVENTION

1) Field of the Invention

This invention relates to an overhead work suspension conveyor for carrying a piece of work such as a tailgate to a main body in a vehicle body assembly line or the like.

2) Description of the Related Art

When tailgates are carried to and assembled on main bodies in a vehicle body assembly line, it has been the conventional practice to carry the tailgates in a predetermined spatial orientation from a tailgate storage to the assembly line.

Tailgates and trunk lids are large components, vary in configuration and size from one car type to another, and cannot be stably stacked one over another. Moreover, a work conveyor of a vehicle body assembly line is generally arranged at a high altitude, for example, on a ceiling to effectively use the space of a plant.

To carry pieces of work from a work storage, which is arranged at a low altitude, for example, on the floor of the plant, to such a work conveyor provided at a high altitude, a drop lifter is generally used. As an alternative, such work pieces are carried by plural workers.

As described above, tailgates and trunk lids are however large components, vary in configuration and size from one car type to another, and cannot be stably stacked one over another. It is therefore impossible to automatically carry them by a drop lifter. Their transportation by workers requires substantial labor.

In the meantime, a suspension conveyor has been proposed in Japanese Patent Application Laid-Open No. SHO 61-178308. The conveyor comprises a movable member guided along a horizontal rail and a plurality of hanger frames secured on the movable member. Each of the hanger frames is adapted to convey a piece of work in a suspended position. Each hanger frame is provided with receivers each of which can be selectively moved between a work suspending position and a work nonsuspending position depending on the car type of work piece, whereby the suspension conveyor has made it possible to convey work pieces of different car families.

The above suspension conveyor, however, is not designed to convey pieces of work up and down. Moreover, the change-over of the plural receivers between their work suspending positions and their work nonsuspending positions must be manually conducted by workers. When pieces of work to be conveyed are frequently changed from one car type to another, the suspension conveyor develops the problem that the work efficiency is very impaired.

SUMMARY OF THE INVENTION

With the foregoing in view, the present invention has as a primary object the provision of an overhead work suspension conveyor which can efficiently and surely hold plural kinds of work pieces of different configurations in a suspended position and permits their easy loading on a work conveyance mechanism.

Another object of the present invention is to provide an overhead work suspension conveyor which can correctly deliver a predetermined specific piece of work to a next work step.

In one aspect of the present invention, there is thus provided an overhead work suspension conveyor, which comprises:

a traverser main body disposed for reciprocation between a lower position and a higher position;

plural spindles turnably supported relative to the traverser main body; plural work support members fixed at upper ends thereof on the spindles and having work supports at lower ends thereof, said work supports being turnable responsive to turning of the corresponding spindles to support a piece of work at an outer periphery thereof; and spindle drive means arranged on the traverser main body and adapted to selectively turn the spindle depending on the kind of the work piece.

Preferably, the overhead work suspension conveyor may further comprise a guide rail along which the traverser main body is reciprocal between the lower position and the higher position.

Two of the plural spindles may be arranged opposing each other at an interval therebetween, and the two spindles may be driven by common spindle drive means. The two spindles can be driven by the common spindle drive means via a reverse turning mechanism so that the two spindles can be turned in opposite directions relative to each other.

Further, the two spindles can each be provided with plural kinds of work support members so that the conveyor can be used for plural kinds of work pieces. The plural work support members may desirably be hanger arms having different lengths.

In addition, the work support member attached to one of the plural spindles can be constructed preferably as a common work support member capable of supporting any work piece at an outer periphery thereof. Spindle drive means can be provided for the spindle having the common work support member so that the spindle drive means is always operative upon conveyance of a piece of work.

The spindle drive means may preferably comprise a fluid pressure cylinder to which the spindles are connected via a mechanism capable of converting a reciprocal linear motion into a rotational motion.

Desirably, two of the plural spindles are arranged opposing each other at an interval therebetween. The two spindles are each provided with plural kinds of work support members so that the conveyor can be used for plural kinds of work pieces, and the work support member attached to another one of the remaining spindles, said another spindle being arranged in a direction crossing the two spindles, is constructed as a common work support member capable of supporting any work piece at an outer periphery thereof.

The overhead work suspension conveyor may further comprise work receiving means, which comprises a frame arranged at a position opposing the traverser main body located near an end point of movement of the traverser main body and provided with means for holding plural kinds of work pieces at positions corresponding to the kinds of the work pieces; and means for causing the frame to pivot between a tilted position and a horizontal position.

Further, the overhead work suspension conveyor may further comprise means for detecting the presence or absence of a piece of work at a predetermined location on the frame and, when present, detecting the kind of the work piece; means for inputting the kind of work piece to be conveyed; means for comparing the kind of the work piece, which has been detected by the detection means, with the kind of the work piece to be conveyed and inputted from the work kind inputting means; control means operable upon receipt of the comparison results from the comparison means so that the control means drives the frame turning means to set the frame in a horizontal position when the kind of the work piece detected by the detection means is consistent with the kind of the work piece to be conveyed but holds the frame in the tilted position and outputs an indication signal without driving the frame turning means when the kind of the work piece detected by the detection means is inconsistent with the kind of the work piece to be conveyed; and means for indicating, upon receipt of the indication signal from the control means, that the kind of the work piece detected by the detection means is inconsistent with the kind of the work piece to be conveyed.

The work kind inputting means may comprise control buttons provided on a control panel or a computer capable of sequentially outputting car type data in accordance with a predetermined production schedule.

In addition, the overhead work suspension conveyor may further comprise means for horizontally reciprocating a part of the conveyor, said part being located near an end point of movement of the traverser on a side opposite to a side on which the work receiving means is disposed, between the position of vertical reciprocation of the traverser main body and a position distant therefrom so that the work piece so conveyed can be transferred to a position near the end point of movement of the traverser on the side opposite to the side on which the work receiving means is disposed.

According to the present invention, plural kinds of work pieces of different configurations can be efficiently and surely held in a suspended position by selectively turning the plural work support members, thereby making it possible to easily load them on a work conveyance mechanism. The present invention has therefore brought about the advantages that the work efficiency can be improved significantly over the prior art and the manhour can also be reduced.

The present invention can also prevent any erroneous delivery of a piece of work other than a specific piece of work, which has been determined beforehand in accordance with a production schedule or the like, to a next work step and can deliver the specific piece of work in a correct spatial orientation to the next work step.

BRIEF DESCRIPTION OF THE DRAWINGS

The above and other objects, features and advantages of the present invention will become apparent from the following description and the appended claims, taken in conjunction with the accompanying drawings, in which:

DESCRIPTION OF THE PREFERRED EMBODIMENT

The one embodiment of the present invention will hereinafter be described with reference to the drawings.

Figure 1:
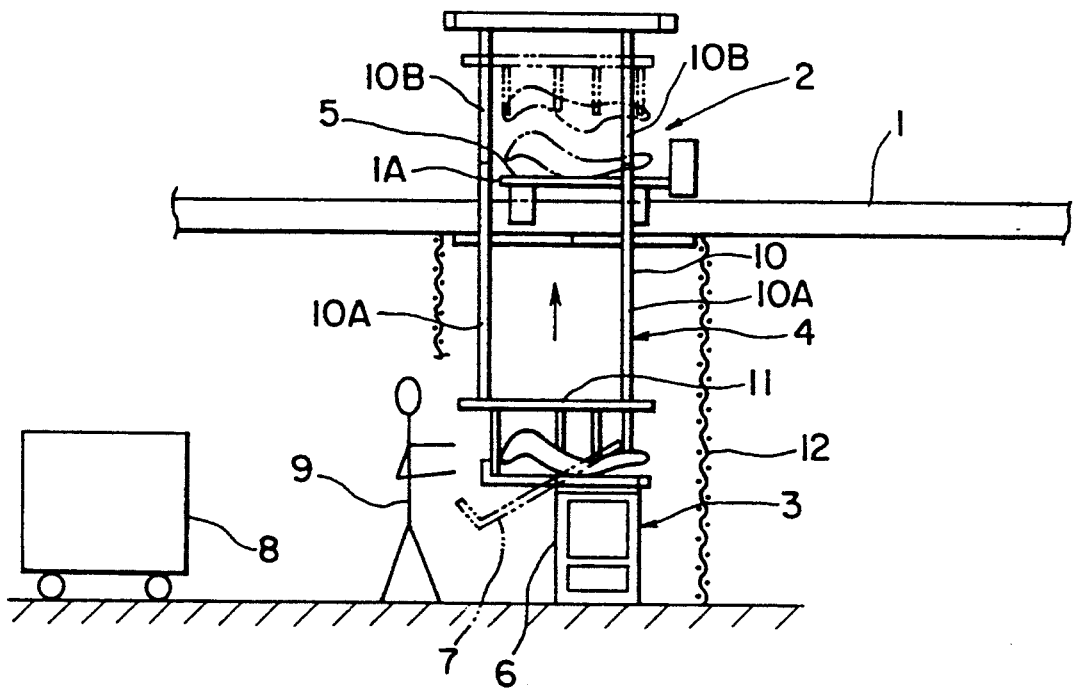
FIG. 1 is a schematic front view showing the manner of arrangement of an overhead work suspension conveyor according to one embodiment of the present invention.
Figure 2:
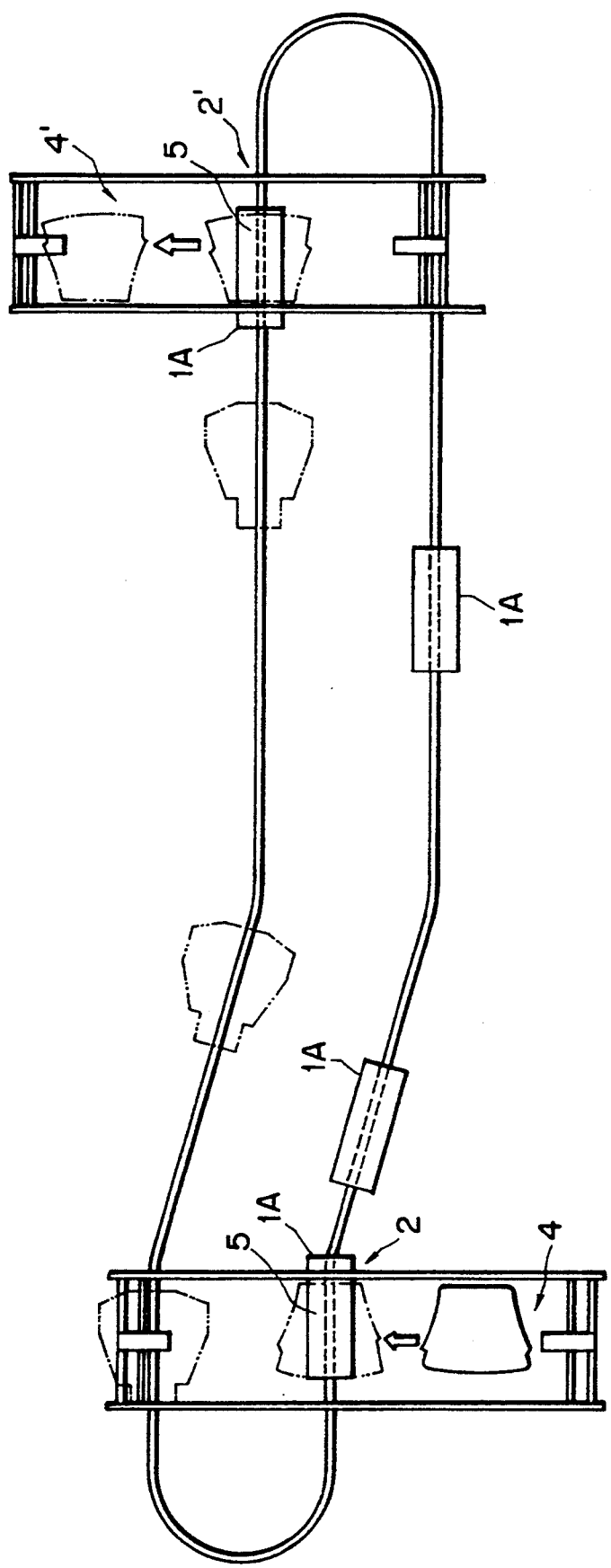
FIG. 2 is a schematic plan view depicting the manner of arrangement of the overhead work suspension conveyor.

FIGS. 1 and 2 show the outline construction of the overhead work suspension conveyor, in each of which numeral 1 indicates an endless feeder rail arranged in the form of a loop at a high altitude. A transfer position 2 is set at a location in a path defined by the feeder rail 1. A loading position 3 is set at a lower altitude, namely, on a floor at a location corresponding to the transfer position 2. A work-loading traverser 4 extends between the transfer position 2 and the loading position 3.

Another transfer position 2' is set at a location in the path defined by the feeder rail 1, said location being spaced from the location where the work-loading traverser 4 is disposed. At a lower location corresponding to the transfer position 2', another loading position is set. Another work-loading traverser 4' extends between the transfer position 2' and the loading position (see FIG. 2).

A plurality of running carriages 1A are arranged along the feeder rail 1 so that each of the running carriages 1A is temporarily stopped at the transfer positions 2,2'. Each running carriage 1A is provided with a work receiving jig 5.

Accordingly, a piece of work which has been loaded by the work-loading traverser 4 is transferred onto the running carriage 1A at the transfer position 2 and is conveyed along the feeder rail 1, whereby the piece of work can be unloaded on the work unloading traverse 4'.

A detailed description will next be made of the construction of a work loading part of the overhead work suspension conveyor.

As is illustrated in FIG. 1, a base frame 6 is arranged as a loading jig at the loading position 3. The base frame 6 is provided with a work loading frame 7 as a work receiving tray, which is pivotal between a tilted position indicated by two-dot chain lines and a horizontal position indicated by solid lines. From a work storage 8, a piece of work is loaded by a worker 9 onto the work loading frame 7.

Figure 8:
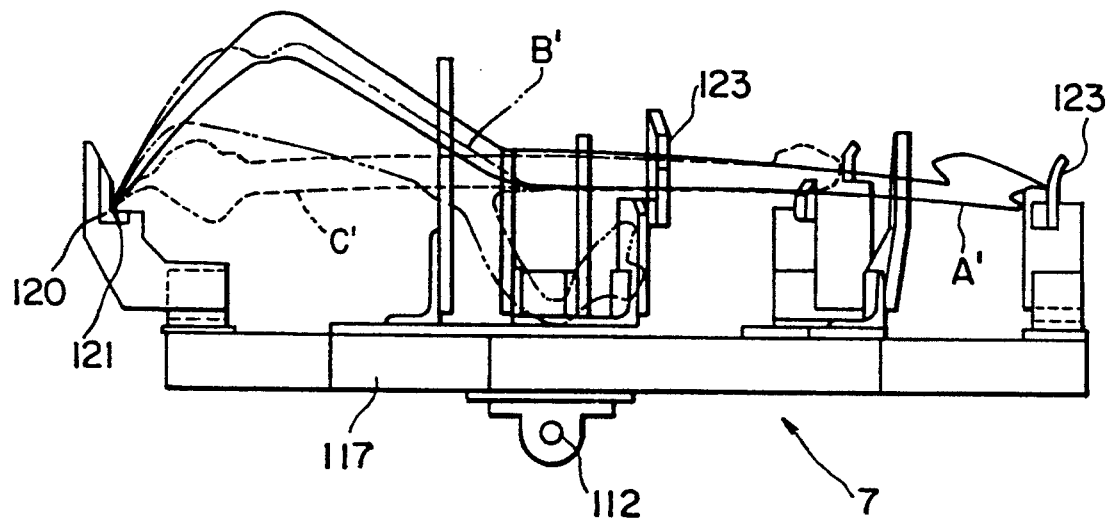
FIG. 8 is a schematic front view of a work loading frame of the work receiving means in the overhead work suspension conveyor, in which the work loading frame is in a horizontal position.
Figure 9:
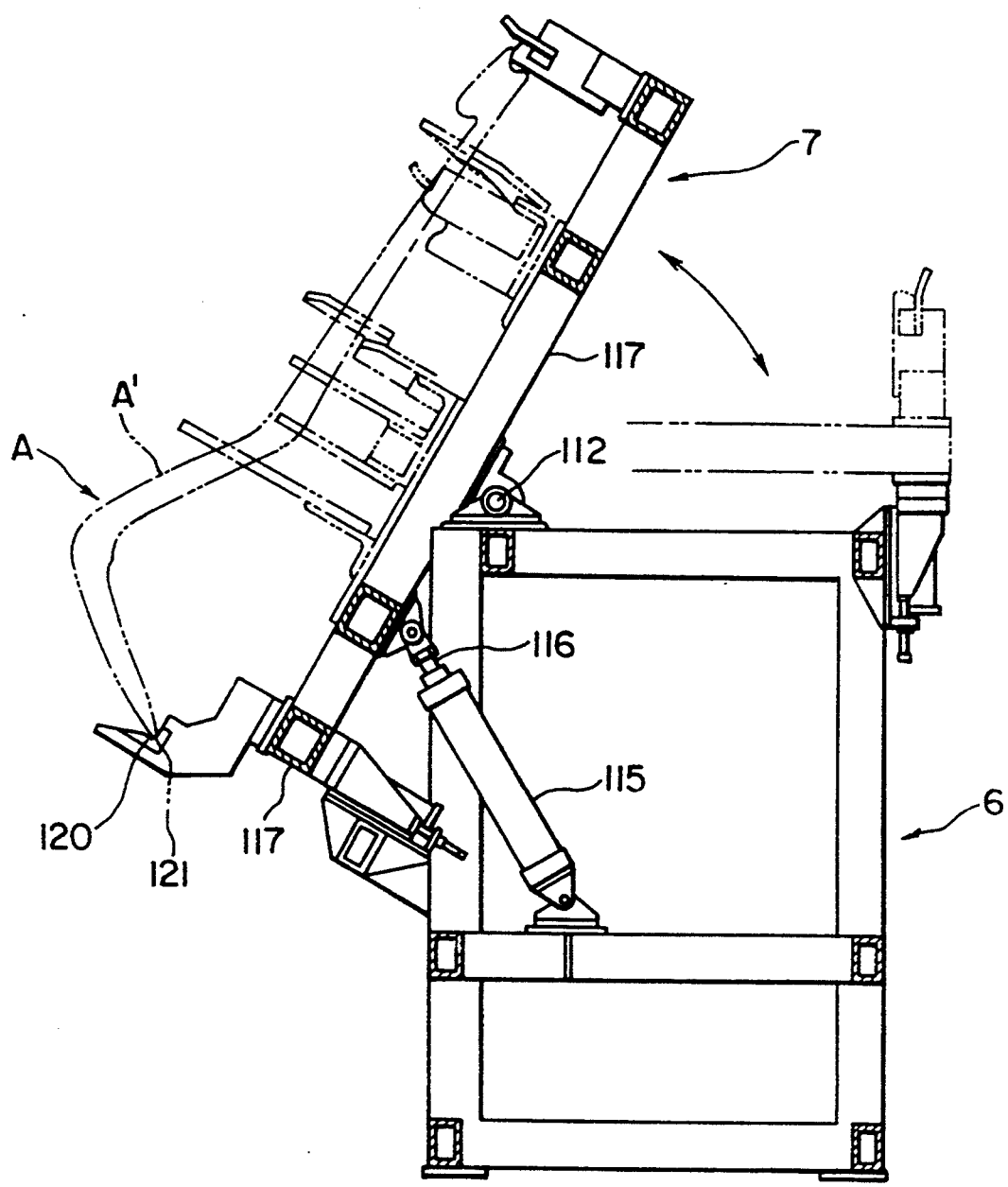
FIG. 9 is a schematic front view of the work loading frame, in which the work loading frame is in a tilted position.

The work loading frame 7 is reciprocally pivotal about a horizontal pivot 112 (see FIGS. 8 and 9) in the directions shown by arrows in FIG. 9 between the horizontal position shown in FIG. 8 and the tilted position illustrated in FIG. 9.

Between the base frame 6 and the work loading frame 7, a fluid pressure cylinder mechanism 115 such as an air cylinder is provided as frame turning means. When a rod 116 of the fluid pressure cylinder mechanism 115 operates in a contracting direction, the work loading frame 7 is raised in the tilted position depicted in FIG. 9. When the rod 116 operates in an extending direction, the work loading frame 7 assumes the horizontal position depicted in FIG. 8.

The work loading frame 7 is formed of plural frame elements 117 which have been assembled in a shape substantially conforming with pieces of work. Although pieces of work, which can be loaded on the work loading frame 7, belong to three or more car families as a matter of fact, the contours of work pieces (trunk lids or tailgates) of only three car families are shown in the illustrated embodiment in order to facilitate its understanding. Depending on the car type, work varies substantially in both configuration and dimensions.

Figure 7:
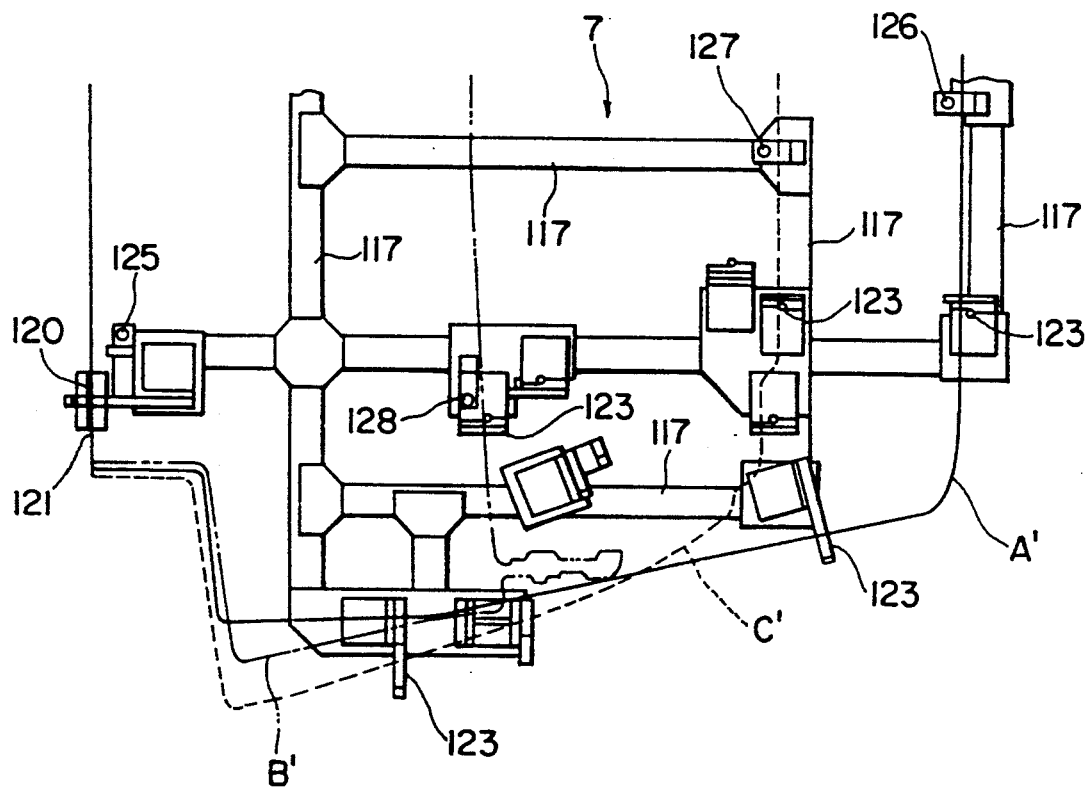
FIG. 7 is a schematic plan view of work receiving means in the overhead work suspension conveyor.

At a left-hand end of the work loading frame 7 as viewed in FIG. 7, there it provided a work positioning portion 120 which serves as a reference point upon loading each piece of work on the frame 7. The work positioning portion 120 is designed and positioned so that, irrespective of the car type of work, each piece of work can be placed at the same position by simply bringing an end portion 121 of the piece of work into abutment against the work positioning portion 120. At a suitable location on the frame 7, a work holder 123 is provided to hold each piece of work at its correct position.

Arranged in the proximity of the work positioning portion 120 is a sensor 125 for detecting the presence or absence of the work. The frame 7 is also provided at suitable locations thereof with car type detection sensors 126,127,128 for detecting the car type of each piece of work (see FIG. 7). The car type detection sensors 126–128 are arranged at locations corresponding to the configuration of each work, whereby the car type of each work piece placed on the frame 7 can be distinguished.

As the sensors 125–128, suitable known detection means such as proximity switches can be used. The pattern of their arrangement can be suitably set in accordance with the car type and configuration of each piece of work and the number of pieces of work of each type. In addition to the above sensors 126–128, there is also provided a hinge abnormality detector sensor (not shown) which allows to detect whether a hinge portion of each piece of work is in a normal position or not.

Figure 10:
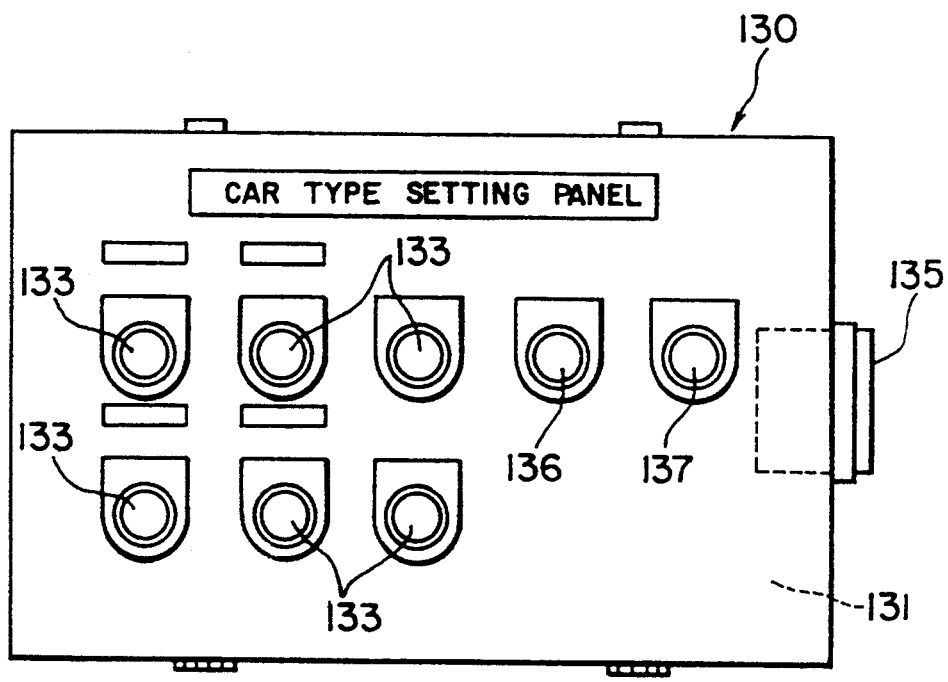
FIG. 10 is a front view of a car type setting panel in the overhead work suspension conveyor.

Adjacent to the loading position 3, a car type setting panel 130 as shown in FIG. 10 is provided. This car type setting panel 130 is basically operated by a worker himself when the worker places each piece of work on the frame 7 in accordance with the production schedule. For example, a control unit 131 is built in the car type setting panel 130 or the like. When the worker has selectively operated any one of plural control buttons (i.e., work type inputting means) 133, the car type of the preset work corresponding to the control button so operated is inputted to the control unit 131. Each control button 133 also serves as a lamp for indicating the car type so set. The control unit 131 may be provided in a control system (not shown) which makes use of a computer.

Figure 11:
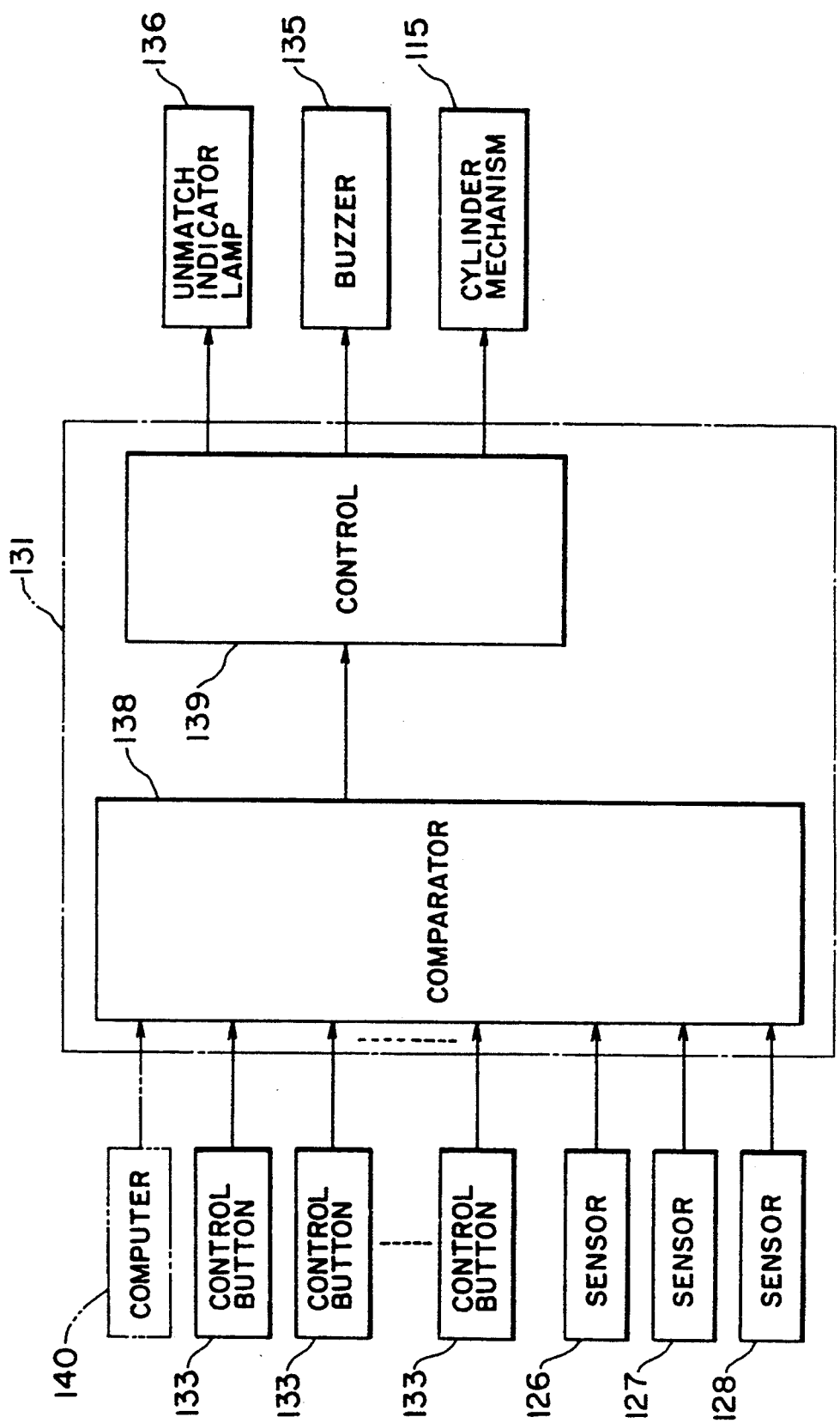
FIG. 11 is a block diagram of a work confirmation control system in the overhead work suspension conveyor.

The control unit 131 is equipped, as shown in FIG. 11, with a comparator 138 and a control 139. The comparator 138 compares the car type of a piece of work detected by the sensor 126–128 with the car type of a piece of work to be conveyed, the latter car type having been inputted by the control button 133.

The control 139, on the other hand, receives the results of the comparison from the comparator means 138. When the former car type is consistent with the latter car type, the control 139 drives the fluid pressure cylinder mechanism 115 to place the work loading frame 7 in the horizontal position shown in FIG. 8. When the former car type is inconsistent with the latter kind, on the other hand, the control 139 does not drive the fluid pressure cylinder mechanism 115 but outputs an indication signal to indicator means while holding the work loading frame 7 in the tilted position illustrated in FIG. 9.

Incidentally, the work type input means may comprise a computer 140 which can sequentially output car type data in accordance with a predetermined production schedule.

At the control unit 131, the preset car type of work inputted in the car type setting panel 130 and the kind of an actual piece of work detected by the sensors 126,127,128 are compared by the comparator 138. Where the preset work and the actual work are inconsistent (car type unmatch), this inconsistency can be indicated to the worker or the like by the control 139 through the indicator means. As one example of the indicator means, a buzzer 135, an unmatch indicator lamp 136 or the like can be used. The car type setting panel 130 is also provided with another indicator lamp 137 which indicates any abnormality in the attachment angle of a hinge portion of each piece of work such as a tailgate.

Turning back to the traverser 4, it is provided with a loading traverser mechanism 11 which, as shown in FIG. 1, is movable up and down while being guided by guide rails 10. The traverser 4 hence holds a piece of work, which has been mounted on the work loading frame 7, and conveys the piece of work in a suspended position from the loading position 3 to the transfer position 2. Incidentally, designated at numeral 12 is a safety fence.

The loading traverser mechanism 11 will be described next. The loading traverser mechanism 11 is constructed as shown in FIG. 3 through FIG. 6. In the drawings, numeral 13 indicates a loading traverser main body which is constructed in a rectangular shape. A first and second spindles 14,15 are arranged symmetrically on opposing two sides of the main body 13, respectively. These spindles 14,15 are turnably supported by journal bearings 16 mounted on the main body 13.

A modified T-shaped, interlocking member 17, which makes up a reverse turning mechanism, is located on one of the remaining sides of the main body 13 at a point between the first and second spindles 14 and 15. The interlocking member 17 is turnably supported relative to the main body 13. To free ends of short arms 17a,17b which are offset over 180° from each other with respect to the interlocking member 17, a first and second connecting rods 18,19 are connected at proximal ends thereof by means of pins, respectively.

An opposite end of the first connecting rod 18 is connected via a pin to a bracket 14a provided extending upwards from the first spindle 14, while an opposite end of the second connecting rod 19 is connected via a pin to a bracket 15a provided extending upwards from the second spindle 15.

A free end of an elongated arm 17c, which extends downwardly from the interlocking member 17, is connected to a piston rod 20a of a first fluid pressure cylinder 20 which is mounted pivotally relative to the main body 13 and is common to both the first and second spindles 14,15. The interlocking member 17 is turned by the first fluid pressure cylinder 20. This turning motion is converted to reciprocal motions by the interlocking member 17 and is then transmitted to the first and second connecting rods 18,19, respectively.

Further, the reciprocal motions of the first and second connecting rods 18,19 are converted to rotational motions by the brackets 14a,15a, respectively, whereby the first and second spindles 14,15 are turned in opposite directions relative to each other.

Figure 6:
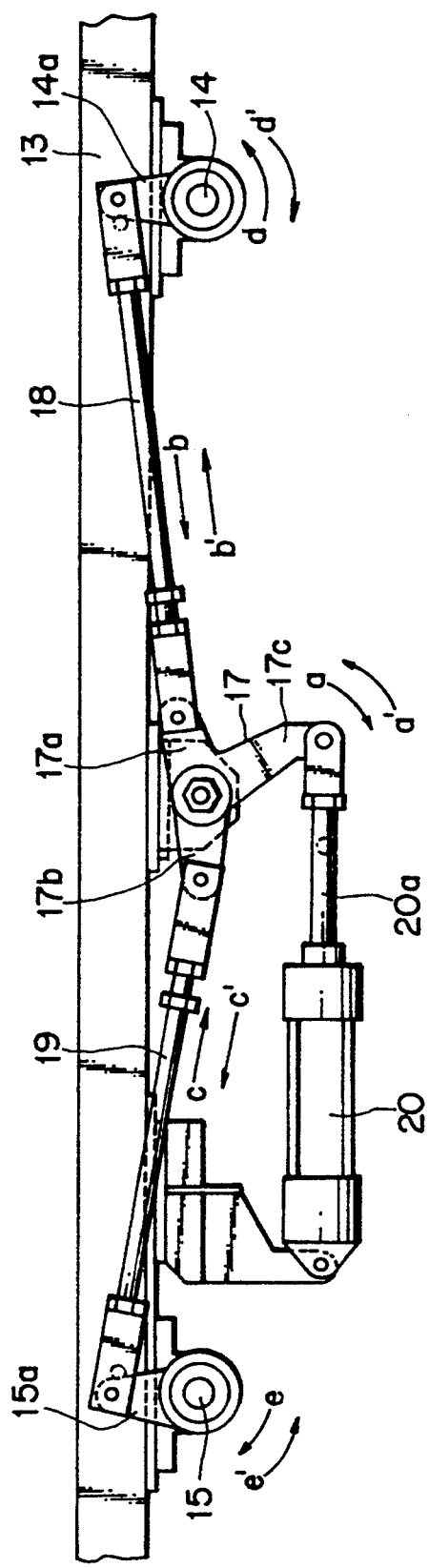
FIG. 6 is a side view of a drive mechanism for a first and second spindles in the overhead work suspension conveyor.

In other words, when the piston rod 20a of the fluid pressure cylinder 20 contracts from the extended position as shown in FIG. 6, the interlocking member 17 turns in the clockwise direction a so that the connecting rods 18,19 are linearly driven in the pulled directions b,c, respectively. As a consequence, the spindles 14,15 are turned in the directions d,e, respectively, so that the spindles 14,15 are caused to turn in the opposite directions. At this time, hanger arms 21-23 which will be described subsequently are caused to open.

When the piston rod 20a of the fluid pressure cylinder 20 conversely extends from a contracted position, the interlocking member 17 turns in the counterclockwise direction a' so that the connecting rods 18,19 are linearly driven in the directions b',c' in which the connecting rods 18,19 are separated from each other. As a consequence, the spindles 14,15 are turned in the directions d',e', respectively, so that the spindles 14,15 are caused to turn in the opposite directions. At this time, the hanger arms 21-23 to be described later are caused to close.

First to fourth hanger arms 21-24 are provided as work support members at predetermined intervals on each of the first and second spindles 14,15 with their upper ends being fixed relative to the corresponding spindles. The hanger arms on the side of the first spindle 14 are arranged symmetrically with their corresponding hanger arms on the side of the second spindle 15. The first to fourth hanger arms 21-24 are provided at lower ends thereof with work supports 21a-24a which extend inwardly at a right angle with respect to the associated hanger arms.

Further, the first to fourth hanger arms 21-24 have different lengths so that work pieces of plural car families different in configuration and dimensions can be supported.

Along the remaining one side of the main body 13, a third spindle 25 is arranged extending in a direction perpendicular to the first and second spindles 14,15. The spindle 25 is turnably supported by journal bearings 26,26 mounted on the main body 13.

An outwardly extending arm 27 is provided on the third spindle 25 at an axially intermediate location thereof. A piston rod 29 of a second fluid pressure cylinder 28 is connected via a pin to a free end of the arm 27. The second fluid pressure cylinder 28 is supported in a vertical position by a bracket 30 which is fixed relative to the main body 13.

In addition, main hanger arms 31,31 having the same length are fixed at upper ends thereof on longitudinal opposite ends of the third spindle 25. Each of the main hanger arms 31,31 is provided at a lower end thereof with a support 31a.

By extension or contraction of the piston rod 29 of the second fluid pressure cylinder 28, the third spindle 25 is caused to turn so that the main hanger arms 31,31 are turned inwardly or outwardly.

A fourth spindle 32 is also disposed underneath the main body 13. The fourth spindle 32 extends in parallel with the third spindle 25 and is located closer to the first fluid pressure cylinder 20. The fourth spindle 32 is turnably supported by journal bearings 33,33 mounted on the main body 13.

An upwardly extending arm 34 is provided at one end of the fourth spindle 32. The arm 34 is connected at a free end thereof to a piston rod 36 of a third fluid pressure cylinder 35 via a pin. The third fluid pressure cylinder 35 is supported in a horizontal position on the lower side of the main body 13.

Fifth hanger arms 37,37 of the same length are fixed at upper ends thereof on longitudinal opposite ends of the fourth spindle 32, respectively. These fifth hanger arms 37,37 are each provided at a lower end thereof with a support 37a.

By extension or contraction of the piston rod 36 of the third fluid pressure cylinder 35, the fourth spindle 32 is caused to turn so that the fifth hanger arm 37,37 are turned inwardly or outwardly.

As the fluid pressure cylinders 20,28,35, air cylinders can be used, for example.

Figure 12:
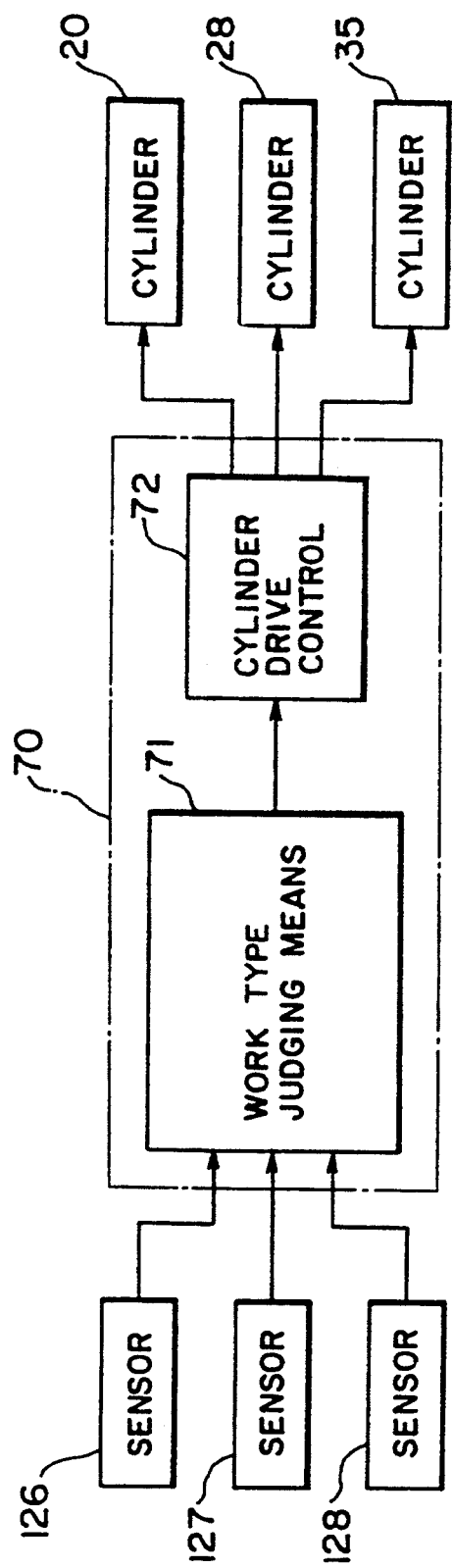
FIG. 12 is a block diagram of a fluid pressure cylinder control system in the overhead work suspension conveyor.

The fluid pressure cylinders 20,28,35 are provided to selectively turn the spindles 14,15,25,32 depending on the car type of each piece of work. For this purpose, a cylinder controller 70 is provided. This cylinder controller 70 is provided, as shown in FIG. 12, with work type judging means 71 and a cylinder drive control 72.

The work type judging means 71 judges the type of the work upon receipt of signals from the sensors 126-128. Depending on the car type of the work piece judged by the work type judging means 71, the cylinder drive control 72 selects fluid pressure cylinders to be driven and give an actuation command to the fluid pressure cylinders so selected.

Incidentally, an upper mechanism of the traverser 4 is provided reciprocally in a horizontal direction between a lifted position P1 and another position P2 separated from the lifted position P1 and located on the feeder rail.

As is illustrated in FIG. 1, each of the guide rails 10 is therefore divided into an upper and lower rails. The lower rail designated at symbol 10A is constructed as a stationary rail, while the upper rail indicated at symbol 10B is constructed as a movable rail which can move in a horizontal direction.

Figure 13:
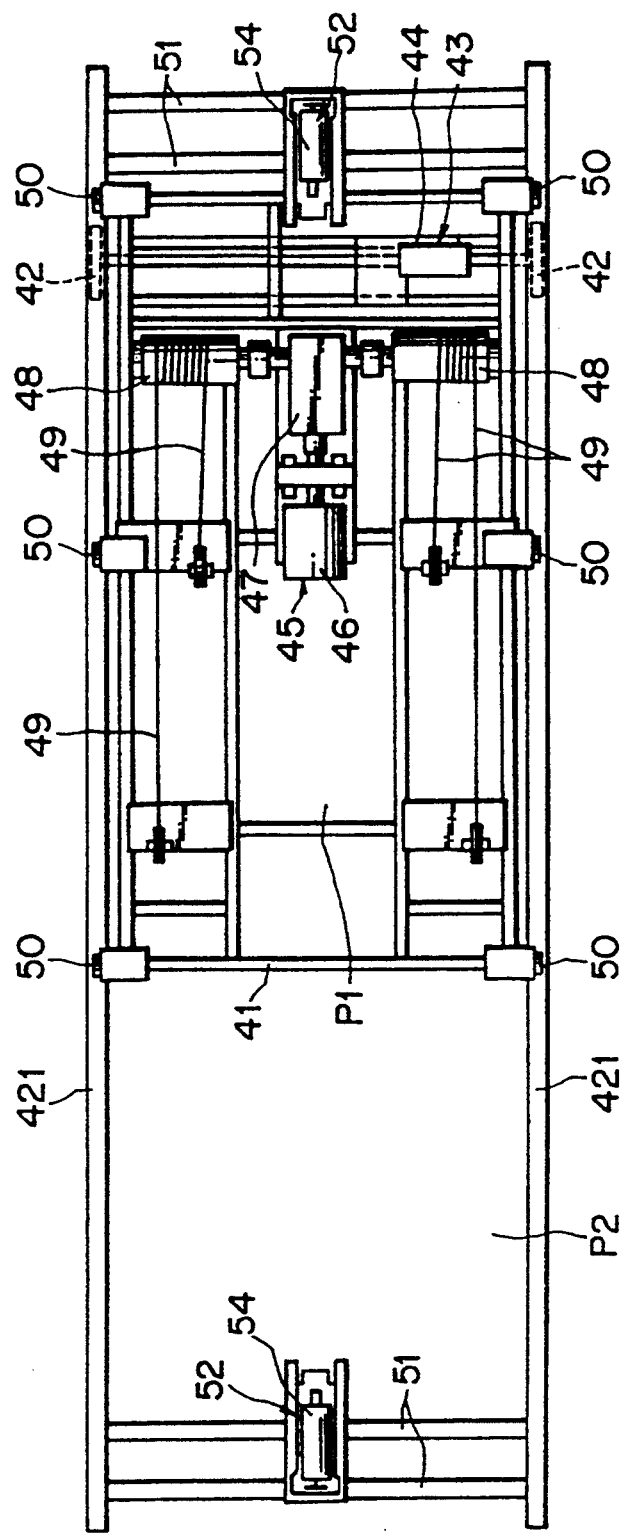
FIG. 13 is a plan view of an upper mechanism in the loading traverser mechanism of the overhead work suspension conveyor.
Figure 14:
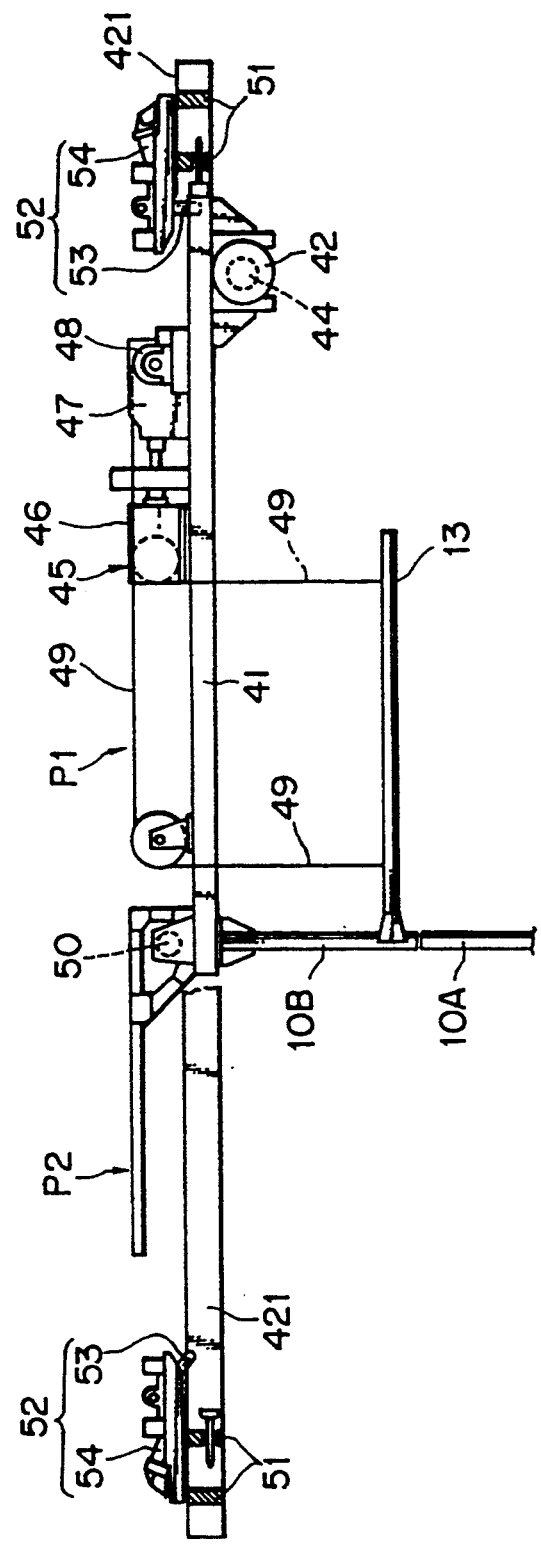
FIG. 14 is a side view of the upper mechanism in the loading traverser mechanism.

As is illustrated in FIGS. 13 and 14, a main frame 41 which supports therefrom the upper rails 10B in a suspended position is disposed in a substantial horizontal position. This main frame 41 is provided with drive wheels 42 and rollers 50 and is movable along two rails 421 which are disposed at the transfer position 2 and extend between the lifted position P1 and the position P2 on the feeder rail. The drive wheels 42 are in contact with lower surfaces of the rails 421. Six rollers 50 are provided, which are all in contact with upper surfaces of the rails 421.

Further, the main frame 41 is also provided with a main frame drive mechanism (horizontal drive mechanism) 43. Namely, the main frame 41 is provided with an electric motor 44, to which the drive wheels 42 are connected. Accordingly, when the traverser main body 13 has reached the lifted position P1 and the traverser main body 13 have been brought into such a state as being guided by the upper rails 10B, the electric motor 44 is energized. As a result, the main frame 41 with the traverser main body 13 included therein can therefore move toward the position P2 on the feeder rail.

The two rails 421 are connected together at opposite ends thereof via connecting members 51. A lock mechanism 52 for locking the main frame 41, which has moved to the lifted position P1 or the position P2 on the feeder rail, is provided on each connecting member 51 disposed at the corresponding ends of the rails. Each lock mechanism 52 is provided with a dog 53 engageable with the main frame 41 and also with a dog driving fluid-pressure cylinder 54 for driving the dog 53.

A traverser main body vertical drive mechanism 45 for moving the traverser main body 13 up and down is mounted on the main frame 41. The traverser main body vertical drive mechanism 45 is provided with an electric motor 46. The electric motor 46 can drive a winch 48 via a reduction gearing 47. A wire 49 wound around the winch 48 is connected to the traverser main body 13. When the electric motor 46 is energized to rotate the winch 48, the traverser main body 13 is lifted.

Figure 15:
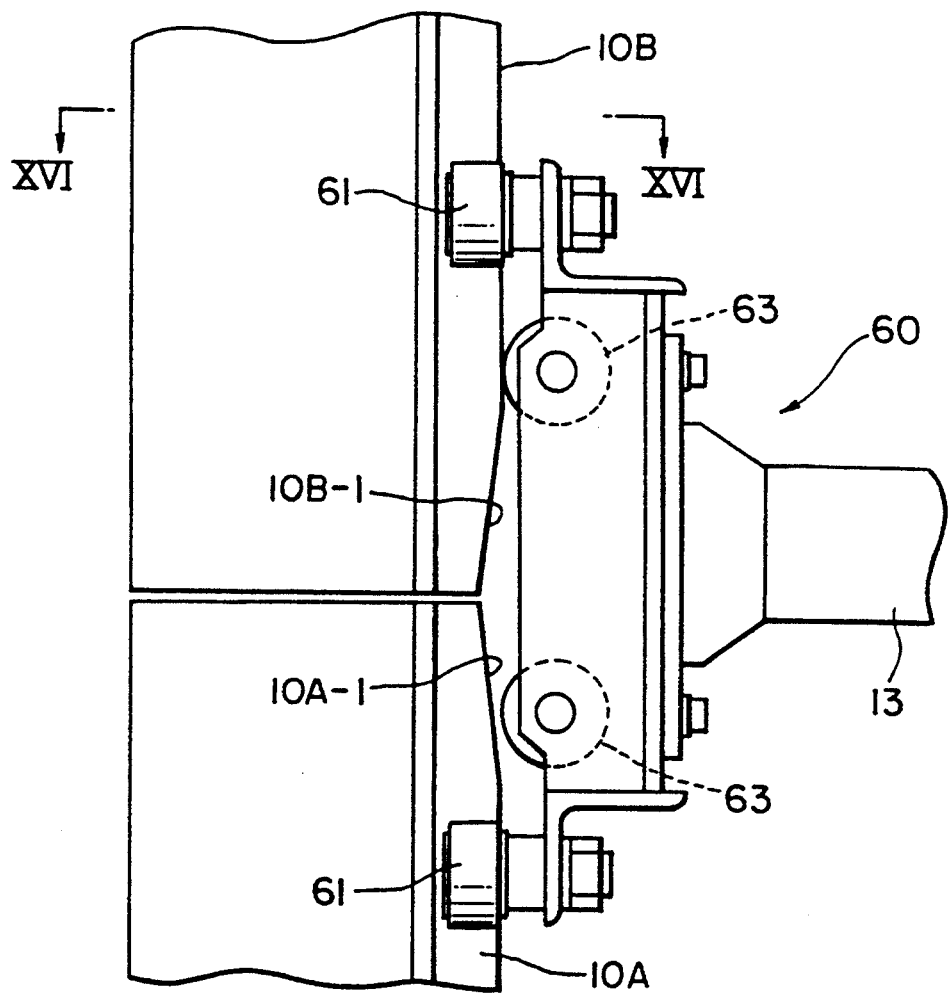
FIG. 15 is a front view showing on an enlarged scale the structure of a joint part of a guide rail in the overhead work suspension conveyor.
Figure 16:
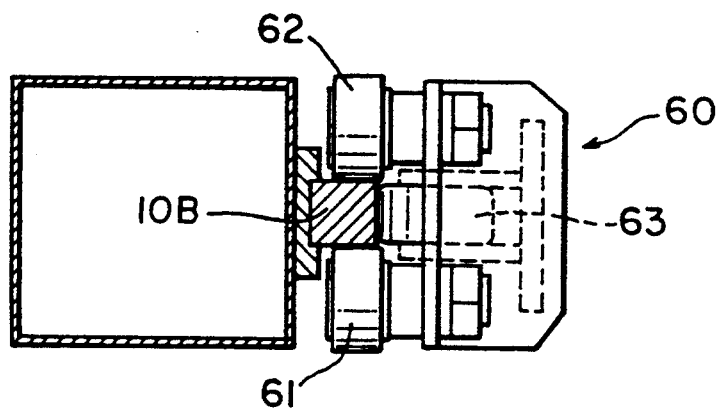
FIG. 16 is a cross-sectional view taken in the direction of arrows XVI—XVI in FIG. 15.

The traverse main body 13 is also provided with a rail guide roller support mechanism 60 as shown in FIGS. 15 and 16, The rail guide roller support mechanism 60 is in turn provided with plural rollers 61,62 which run along both side walls of the corresponding guide rail 10, and is also provided with plural rollers 63 which run along a back wall of the corresponding guide rail 10.

Each upper rail 10B is brought into alignment with its corresponding lower rail 10A at the lifted position P1. At their junction, proximal end portions 10A-1,10B-1 of the upper rail 10B and the lower rail 10A are tapered as shown in FIG. 15. Owing to this construction, the impact that occurs when the traverser main body 13 passes beyond the joint between the upper rail 10B and the lower rail 10A has been reduced.

The unloading traverser 4' has substantially the same construction as the loading traverser 4 so that its description is omitted.

Figure 3:
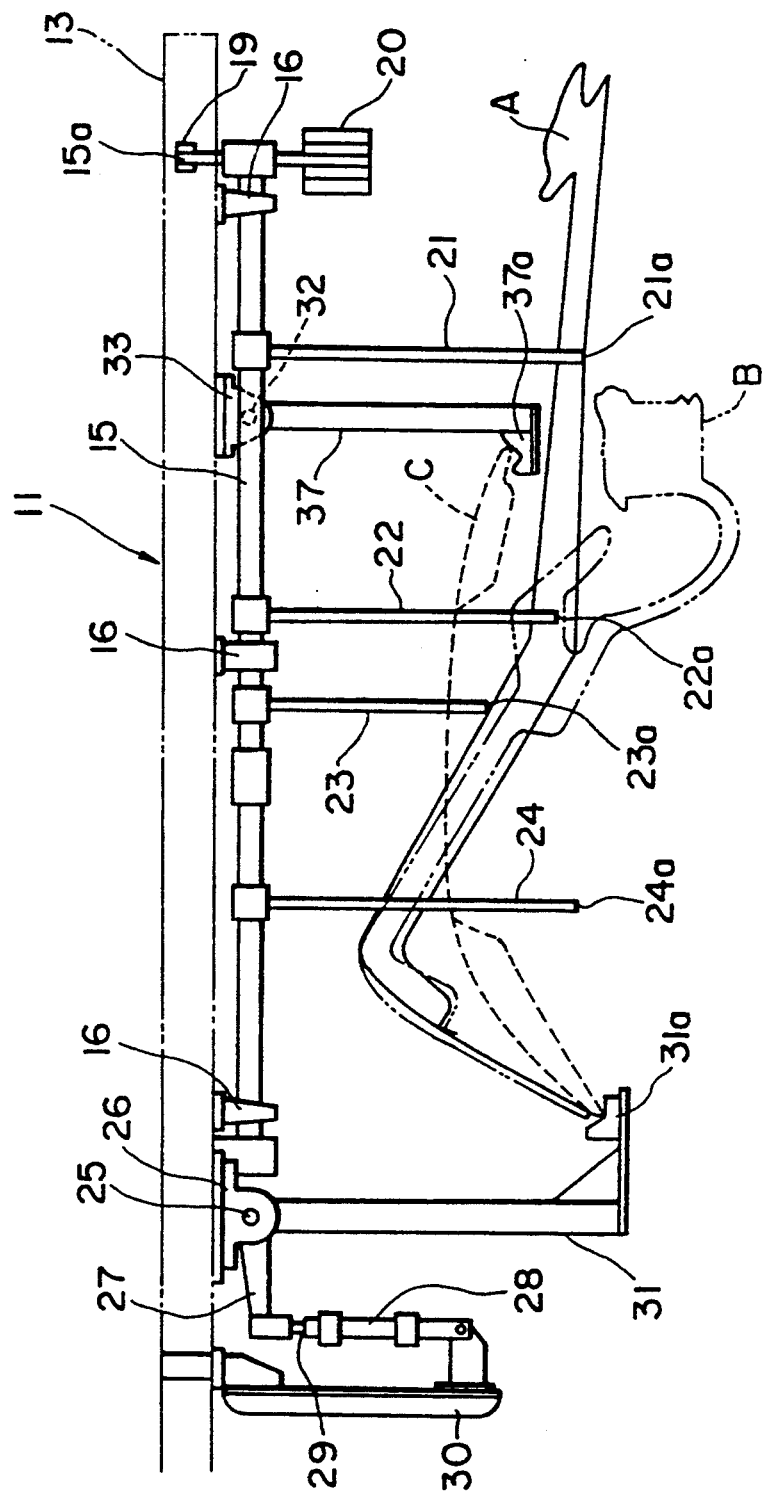
FIG. 3 is a side view of a loading traverser mechanism in the overhead work suspension conveyor.
Figure 4:
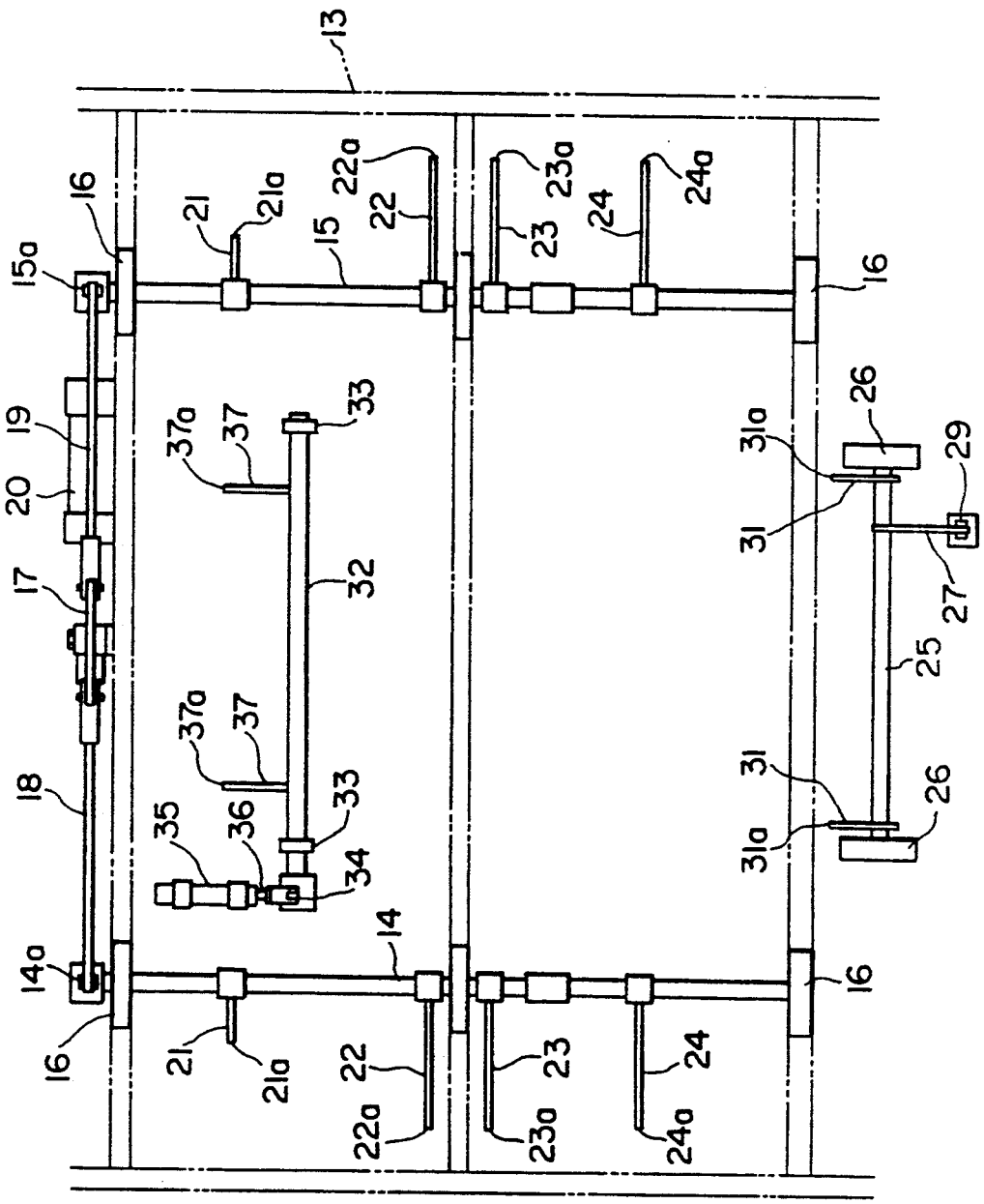
FIG. 4 is a plan view of the loading traverser mechanism.
Figure 5:
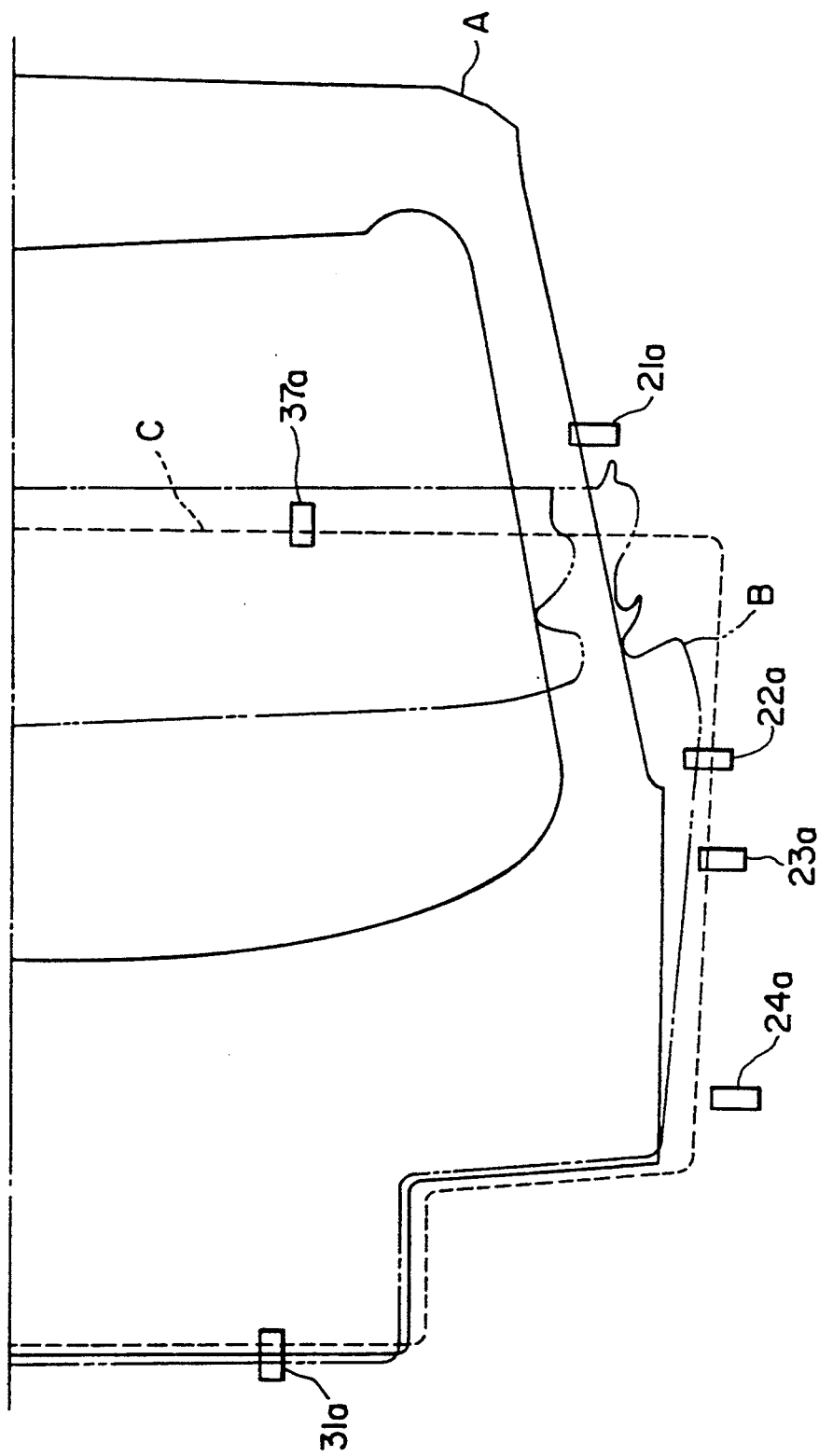
FIG. 5 is a schematic illustration of a positional relationship of hanger arms in the overhead work suspension conveyor.

Operation of the overhead work suspension conveyor constructed as described above will next be described. In the illustrated embodiment, tailgates are conveyed as pieces of work in a suspended position. In FIGS. 1 and 3 (or FIG. 7), the work pieces shown by the solid lines are large tailgates A (A') while those indicated by the two-dot chain lines are small tailgates B (B').

At the work storage 8 illustrated in FIG. 1, tailgates A,B of plural car families, said tailgates being different in configuration and dimensions, are stored together. The order of their loading has been set in accordance with the schedule of the production line, and car type data according to the schedule of the production line have been inputted in the loading traverser mechanism 11 through the car type setting panel 130 or the computer 140.

When the loading traverser mechanism 11 is at the lifted position, the worker mounts, in accordance with the order of the loading, the tailgate A on the work loading frame 7 which is in the tilted position. Once the tailgate A is set on the work loading frame 7 in this position, the end portion 121 of the tailgate is supported by the work positioning portion 120 so that the tailgate is positioned in a predetermined spatial orientation. The presence of the tailgate is then detected by the work sensor 125 and the sensors 126–128 are selectively actuated by the car type of the tailgate. Therefore, the car type of the tailgate is judged.

For example, a first tailgate A' is detected by the first sensor 126, a second tailgate B' by the second sensor 127, a third tailgate C' by the third sensor 128.

The car type of each tailgate detected by the sensor 126, 127 or 128 and that of a preset piece of work inputted in the car type setting panel 130 are then compared at the control unit 131. When they are consistent with each other, the piston rod 116 of the fluid pressure mechanism 115 is operated in the extending direction so that the work loading frame 7 is pivoted to the horizontal position depicted in FIG. 8. The tailgate hence lies in the horizontal position and is ready for delivery to a transfer device, namely, to the traverser 4.

Where the car type of a tailgate detected by the sensor 126, 127 or 128 is different from the car type of a preset piece of work inputted in the car type setting panel 130, the buzzer 135 makes a buzzing sound and the unmatch indicator lamp 136 is also lit so that the worker is informed of the occurrence of an unmatch in car type. In this case, the fluid pressure mechanism 115 is not operated.

In the illustrated embodiment, a preset piece of work (car type) inputted by a worker is compared with the car type of a tailgate detected by the sensor 126, 127 or 128. Upon practice of this invention, it is possible to compare car type data, which have been inputted beforehand in the computer 140 according to a predetermined production schedule, with the car type of each tailgate detected by the sensor 126, 127 or 128. When the work loading frame 7 is pivoted into the horizontal position because the car type of the detected tailgate is found to be consistent with the preset car type inputted by the worker, the loading traverser mechanism 11 descends.

When the loading traverser mechanism 11 descends to a predetermined position while the main hanger arm 31, the first to fourth hanger arms 21–24 and the fifth hanger arm 37 are kept opened outwards, the first to third cylinders 20,28,35 are selectively operated by a control signal from the cylinder controller 70 in accordance with car type data.

Assume now that a piece of work set at the loading position 3 is, for example, a tailgate A (or A'). The first and second fluid pressure cylinders 20,28 are then operated. The interlocking member 17 is turned by the first cylinder 20. This turning motion is converted to reciprocal motions by the interlocking member 17 and is transmitted to the first and second connecting rods 18,19, respectively.

Reciprocal motions of the first and second connecting rods 18,19 are converted to rotational motions by the brackets 14a,15a, respectively, whereby the first and second spindles 14,15 are caused to turn in opposite directions.

Although the first to fourth hanger arms 21 to 24 are caused to turn inwardly at the same time by the turning of the first and second spindles 14,15, the hanger arm provided exclusively for the tailgate A is the first hanger arm 21 so that only the support 21a is extended toward an underside of an outer peripheral edge of the tailgate A. The locations and lengths of the remaining second to fourth hanger arms 22 to 24 are determined so that they do not interfere with the tailgate A, whereby the second to fourth hanger arms 22 to 24 do not come into contact with the tailgate A without any interference therewith even when they turn inwardly at the same time.

At the same time, the piston rod 29 of the second fluid pressure cylinder 28 contracts so that the arm 27 turns downwardly. As a consequence, the third spindle 25 is caused to turn and, by this turning, the main hanger arms 31,31 are turned inwardly whereby the supports 31a,31a are extended toward the underside of the outer peripheral edge of the tailgate A.

Accordingly, the tailgate A is suspended by the two main hanger arms 31,31 and the two first hanger arms 21,21, namely, by the four hanger arms in total, and the loading traverser mechanism 11 then moves upwards.

When the traverser main body 13 has moved upwards to the lifted position P1 as described above and has been brought into such as state as being guided by the upper rails 10B, the electric motor 44 is energized. As a result, the main frame 41 with the traverser main body 13 included therein can move toward the position P2 on the feeder rail. Upon arrival at the position P2 on the feeder rail, the main frame 41 is locked by the lock mechanism 52.

The tailgate A is then transferred onto a running carriage 1A which has been held in readiness at the transfer position 2, and is conveyed to the next work step.

When the piece of work set on the work loading frame 7 in accordance with the loading schedule is a tailgate B (or B'), the loading traverser mechanism 11 descends likewise while the main hanger arm 31, the first to fourth hanger arms 21 to 24 and the fifth hanger arm 37 are kept opened outwardly. When the loading traverser mechanism 11 has moved to a predetermined position, the first to third cylinders 20,28,35 are selectively operated in accordance with the car type data.

Since the piece of work just set at the loading position 3 is the tailgate B (B'), the first cylinder 20 and the second cylinder 28 are operated. By the first cylinder 20, the first and second spindles 14,15 are turned and the first to fourth hanger arms 21-24 are turned inwardly at the same time. Since the hanger arm provided exclusively for the tailgate B (B') is the second hanger arm 22, only the support 22a is extended toward an underside of an outer periphery of the tailgate B (B'). The locations and lengths of the remaining first, third and fourth hanger arms 21,23,24 are determined so that they do not interfere with the tailgate B (B'), whereby the first, third and fourth hanger arms 21,23,24 do not come into contact with the tailgate B (B') without any interference therewith even when they turn inwardly at the same time.

At the same time, the piston rod 29 of the second fluid pressure cylinder 28 contracts so that the arm 27 turns downwardly. As a consequence, the third spindle 25 is caused to turn and, by this turning, the main hanger arms 31,31 are turned inwardly whereby the supports 31a,31a are extended toward the underside of the outer peripheral edge of the tailgate B (B').

Accordingly, the tailgate B (B') is suspended by the two main hanger arms 31,31 and the two second hanger arms 22,22, namely, by the four hanger arms in total, and the loading traverser mechanism 11 then moves upwards. The tailgate B (B') is then transferred onto a running carriage 1A which has been held in readiness at the transfer position 2, and is conveyed to the next work step.

When the piece of work set at the loading position 3 is a tailgate C (or C'), the first, second and third fluid pressure cylinders 20,28,35 operate according to the car type data. Accordingly, the resulting turning of the first and second spindles 14,15 by the first fluid pressure cylinder 20 and the turning motion of the third spindle 25 by the second fluid pressure cylinder 28 act as in the case of the tailgates A,B. The support 23a of the third hanger arm 23, however, is extended toward an underside of the tailgate C (C'). At the same time, the fourth spindle 32 is also turned by the action of the third cylinder 35. The fifth hanger arms 37,37 are therefore caused to turn inwards, so that their supports 37a,37a are extended toward the underside of the tailgate C (C').

As a consequence, the tailgate C (C') is suspended by the two main hanger arms 31,31, the two third hanger arms 23,23 and the two fifth hanger arms 37,37, namely, by the six hanger arms in total. Hence, the main hanger arms 31,31 are commonly used for all the tailgates A,B,C (A',B',C').

According to this embodiment, work pieces of plural car families having different configurations can therefore be efficiently and surely held in a suspended position by selectively turning the plural work support members, thereby making it possible to easily load them on a work conveyance mechanism. The embodiment described above has therefore brought about the advantages that, compared with the prior art, the work efficiency can be improved significantly and the man-hour can also be reduced.

This embodiment can also prevent any erroneous delivery of a piece of work other than a specific piece of work, which has been determined beforehand in accordance with a production schedule or the like, to a next work step and can deliver the specific piece of work in a correct spatial orientation to the next work step.

The embodiment described above has the hanger arms provided exclusively for the tailgates of the three car families, respectively. It is however possible to include hanger arms exclusively for tailgates of four or more car families, respectively. The over-head word suspension conveyor of the above embodiment is not limited to the suspension conveyance of tailgates but can be used for the suspension conveyance of other large components such as trunk lids or hoods.

What is claimed is:

1. An overhead work suspension conveyor, comprising:
    a traverser main body disposed for reciprocation between a lower position and a higher position;
    plural spindles turnably supported relative to the traverser main body;
    plural work support members fixed at upper ends thereof on the spindles and having work supports at lower ends thereof, said work supports being turnable respective to turning of the corresponding spindles to support a piece of work at an outer periphery thereof, wherein the plural work support members are hangar arms having different lengths; and spindle drive means arranged on the traverser main body and adapted to selectively turn the spindle depending on the kind of the work piece.

2. An overhead work suspension conveyor according to claim 1, wherein at least one of the work support arms is constructed as a common work support arm which cooperates with at least one of the other work support arms to support any work piece at an outer periphery thereof.

3. An overhead work suspension conveyor according to claim 2, wherein spindle drive means for the spindle having the common work support arm is always operative upon conveyance of a piece of work.

4. An overhead work suspension conveyor according to claim 1, wherein said spindle drive means comprises a fluid pressure cylinder to which the spindles are connected via a mechanism capable of converting reciprocal linear motion into rotational motion.

5. An overhead work suspension conveyor according to claim 1, wherein two of the plural spindles are arranged opposing each other with an interval therebetween, the two spindles each being provided with plural kinds of work support arms so that the conveyor can be used for plural kinds of work pieces, and wherein another one of said spindles is arranged in a direction crossing the two spindles and is provided with a common work support arm which cooperates with at least one of the other work support arms from one of the two spindles to support any work piece at an outer periphery thereof.

6. An overhead work suspension conveyer, comprising:
   a traverser main body disposed for reciprocation between a lower position and a higher position;
   plural spindles turnably supported relative to the traverser main body;
   plural work support members fixed at upper ends thereof on the spindles and having work supports at lower ends thereof, said work supports being turnable responsive to turning of the corresponding spindles to support a piece of work at an outer periphery thereof;
   spindle drive means arranged on the traverser main body and adapted to selectively turn the spindle depending on the kind of the work piece;
   work receiving means, including a frame arranged at a position opposing the traverser main body located near an end point of movement of said traverser main body and provided with means for holding plural kinds of work pieces at positions corresponding to the kind of the work pieces, and means for causing the frame to pivot between a tilted position and a horizontal position;
   means for detecting the presence or absence of a piece of work at a predetermined location on the frame and, when present, detecting the kind of the work piece;
   means for inputting the kind of a piece of work to be conveyed;
   means for comparing the kind of the work piece, which has been detected by said detection means, with the kind of the work piece to be conveyed and inputted from said work kind inputting means;
   control means operable upon receipt of the comparison results from said comparison means so that said control means drives said frame turning means to set the frame in a horizontal position when the kind of the work piece detected by said detection means is consistent with the kind of the work piece to be conveyed but holds the frame in the tilted position and outputs an indication signal without driving said frame turning means when the kind of the work piece detected by said detection means is inconsistent with the kind of the work piece to be conveyed; and
   means for indicating, upon receipt of the indication signal from said control means, that the kind of the work piece detected by said detection means is inconsistent with the kind of the work piece to be conveyed.

7. An overhead work suspension conveyor according to claim 6, wherein said work kind inputting means comprises control buttons provided on a control panel.

8. An overhead work suspension conveyor according to claim 6, wherein said work kind inputting means comprises a computer capable of sequentially outputting car type data in accordance with a predetermined production schedule.

9. An overhead work suspension conveyor according to claim 6, further comprising means for horizontally reciprocating a part of the conveyor, said part being located near an end point of movement of the traverser on a side opposite to a side on which said work receiving means is disposed, between the position of vertical reciprocation of the traverser main body and a position distant therefrom so that the work piece so conveyed can be transferred to a position near the end point of movement of the traverser on the side opposite to the side on which said work receiving means is disposed.

* * * * *